United States Patent [19]

Tsuzurahara

[11] Patent Number: 4,853,824
[45] Date of Patent: Aug. 1, 1989

[54] THROUGH-TYPE CAPACITOR

[75] Inventor: Mamoru Tsuzurahara, Mobara, Japan

[73] Assignee: Hitachi, Ltd., Tokyo, Japan

[21] Appl. No.: 199,710

[22] Filed: May 27, 1988

[30] Foreign Application Priority Data

Jun. 5, 1987 [JP] Japan .................... 62-139735
Jun. 26, 1987 [JP] Japan .................... 62-157636

[51] Int. Cl.⁴ .................... H01G 4/42; H03H 7/00
[52] U.S. Cl. .................... 361/302; 333/182
[58] Field of Search ............ 361/302, 306, 307, 433 T; 333/182

[56] References Cited

U.S. PATENT DOCUMENTS 3,289,118 11/1966 Garstang .................... 361/302 X
3,517,437 6/1970 Szobonya .................... 361/307 X
4,514,782 4/1985 Sakamoto et al. ............ 361/306

FOREIGN PATENT DOCUMENTS 104446 6/1982 Japan .

Primary Examiner—Donald A. Griffin
Attorney, Agent, or Firm—Antonelli, Terry & Wands

[57] ABSTRACT

An improved construction of a through-type capacitor suitable for used with a magnetron is disclosed. The through-type capacitor comprises a dielectric member formed with a through hole at the center thereof, a central conductor inserted into the through hole, and electrodes formed on the outer peripheral surface of the dielectric member and the inner peripheral surface of the through hole. The electrode on the inner peripheral surface of the through hole is connected by solder to the central conductor. The central conductor and the dielectric member have a portion free of solder therebetween in which the solder is expandable.

14 Claims, 4 Drawing Sheets

FIG. 5
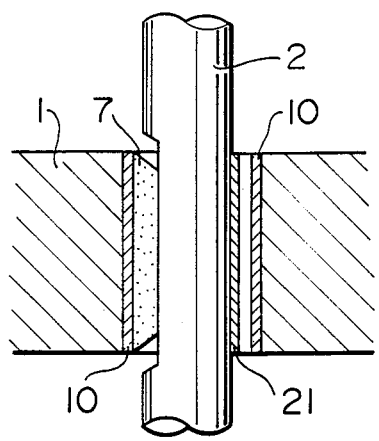
FIG. 6A    FIG 6B
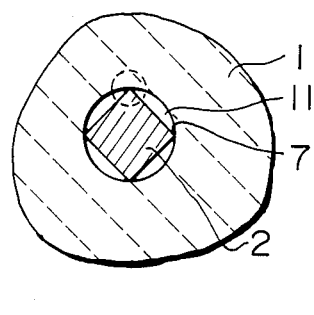 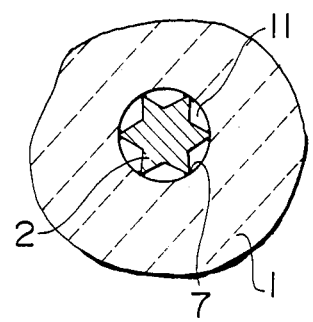

FIG. 7
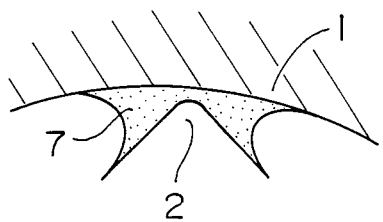
FIG. 8A   FIG. 8B
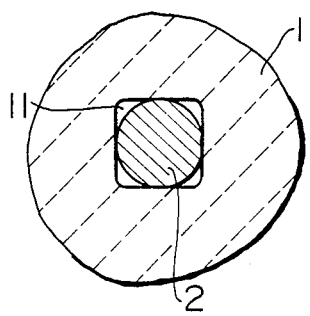 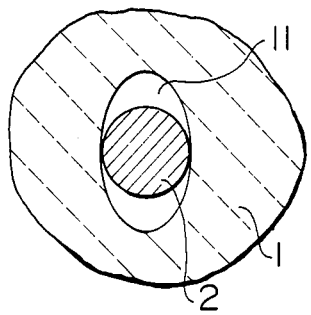

THROUGH-TYPE CAPACITOR

BACKGROUND OF THE INVENTION

The present invention relates to an improvement in the construction of a through-type capacitor, or more in particular to a reliable through-type capacitor most suited as a capacitor used for a high-frequency filter of a magnetron.

A construction of a through-type capacitor used with a filter of the magnetron is disclosed, for example, in No. JP-U-57-104446 filed for utility model registration in Japan by Tokyo Shibaura Electric Co., Ltd. on Dec. 18, 1980. The magnetron oscillates with high frequency, and therefore part of the fundamental oscillation electric wave or its high harmonics is liable to leak outside through power lines. To prevent this, a high-frequency cut-off filter is normally inserted in the connecting line between the magnetron and an external power supply. The filter is generally configured of a choke coil and a through-type capacitor with a filter case as an earth (ground) electrode. In the case of the magnetron used with the microwave oven, the through-type capacitor is repeatedly subjected to thermal stress by the heat generated in the microwave oven. Further, in an environment comparatively low in temperature, a wide range of heat fluctuations from low to high temperatures may adversely affect the service life of the through-type capacitor.

The problem in particular is that the different coefficients of thermal expansion among the members making up the through-type capacitor generates a mechanical stress due to thermal fluctuations in the through-type capacitor. If this stress would generate repeatedly over a long time, the internal structure of the capacitor would be broken.

Generally, in a through-type capacitor used as a dielectric member of ceramic material, the dielectric member is formed in cylindrical form, and a through hole for passing a central conductor (power line) is formed at the center of the cylinder. The inner peripheral surface of the through hole and the outer peripheral surface of the dielectric member are respectively galvanized with nickel to provide electrode surfaces. The central conductor is passed through the through hole and the central conductor is soldered with the electrode surface of the inner peripheral surface of the through hole. Further, the electrode on the outer peripheral surface of the dielectric member is soldered with the earth electrode. As a result, the entire clearance surrounded by the inner peripheral surface of the through hole and the central conductor is filled with solder. The coefficient of thermal expansion of strontium titanate ($SrTiO_3$) or barium titanate ($BaTiO_3$) used as material of the dielectric member is $6.2 \times 10^{-6}/K$ (K: Absolute temperature), that of iron used as a material of the central conductor $11.76 \times 10^{-6}/K$, that of copper $20 \times 10^{-6}/K$, and that of solder $21 \times 10^{-6}/K$. As seen from this, the coefficient of thermal expansion of the central conductor is different from that of the dielectric member to such an extent that the central conductor is thermally deformed to a degree different from the dielectric member. This difference in thermal deformation generates a compression stress with the heating of the capacitor, and a tension stress occurs at the time of cooling thereof along the diameter of the through hole of the dielectric member. When the capacitor is alternately heated and cooled in this way, stress would be repeatedly applied to the internal parts of the capacitor, thereby finally breaking the parts of the dielectric member.

SUMMARY OF THE INVENTION

The object of the present invention is to provide a through-type capacitor which absorbs the mechanical stress caused by thermal deformation to prevent the dielectric member from breaking down.

In order to achieve this object, there is provided according to the present invention a through-type capacitor in which a spacial clearance is provided between the dielectric member and the central conductor, the spacial clearance being freely deformable in order that the stress due to the deformation of the dielectric member and the central conductor may be absorbed into the deformation (expansion, in particular) of solder, the spacial clearance being formed by controlling the regions of the inner peripheral surface of the through hole filled up with solder or forming a recess in the central conductor.

BRIEF DESCRIPTION OF THE DRAWINGS

FIG. 5 is a partially detailed sectional view of a through-type capacitor according to the present invention.

FIGS. 6A and 6B are diagrams showing sectional views of the central conductor and the through hole respectively.

FIG. 7 is a partially enlarged view of the connection corn of the conductor and the inner peripheral surface of the dielectric member.

FIGS. 8A and 8B are diagrams showing sectional views of the central and the through hole respectively.

DESCRIPTION OF THE PREFERRED EMBODIMENTS

Figure 1:
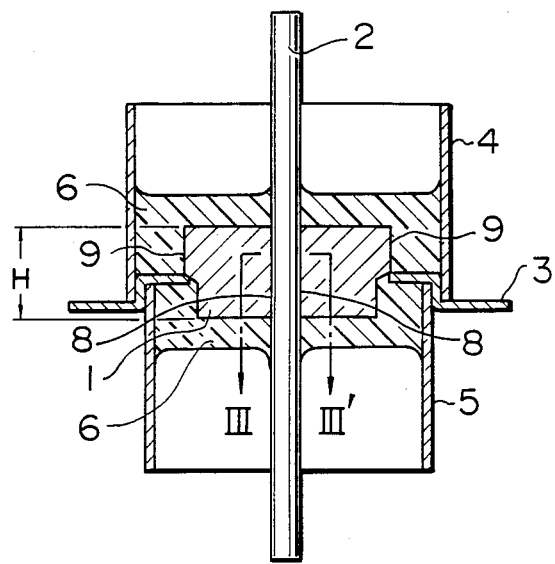
FIG. 1 is a longitudinal sectional view of a through-type capacitor according to the present invention.
Figure 2:
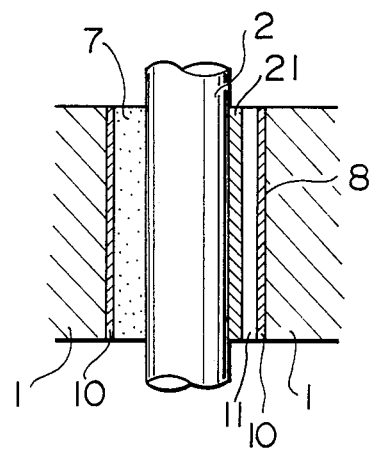
FIG. 2 is a partially detailed sectional view of a through-type capacitor according to the present invention.

FIG. 1 is a longitudinal sectional view of a through-type capacitor according to an embodiment of the present invention, and FIG. 2 a detailed sectional view showing the connection of the dielectric member 1 and the central conductor 2 in FIG. 1. It should be noted, however, that for facilitating the understanding of the construction, the diagram of FIG. 2 is drawn in an exaggerated form but not in actual dimensional relations. In the drawings, reference numeral 1 designates a cylindrical ceramic dielectric member made of, for instance, strontium titanate ($SrTiO_3$) having the central part thereof formed with a through hole for passing the central conductor 2. The outer peripheral surface 9 of the dielectric member 1 and the inner peripheral surface 8, that is, the wall surface of the through hole, are galvanized with nickel to form electrode surfaces (first and second electrode surfaces). The inner and outer electrode surfaces and the dielectric member 1 make up a capacitor. The central conductor 2 is electrically and mechanically connected with an electrode 10 on the inner peripheral surface 8 by solder 7. The electrode of the outer peripheral surface 9 of the dielectric member 1, on the other hand, is connected with an earth electrode plate 3 by solder. The earth electrode plate 3 has the section thereof bent in crank as shown with armor cases 4, 5 of insulating material embedded therein from upper and lower directions. Further, in order to improve the insulation, the insulating resin 6 is injected and solidified in the armor cases 4, 5. In mounting this through-type capacitor on a filter case (not shown) of the magnetron, the earth electrode plate 3 is connected to be fixed to the filter case, so that the lower part thereof is positioned in the filter case and the upper part thereof is positioned outside the case in FIG. 1.

In FIG. 2, numeral 21 designates solder resist coated on the surface of the central conductor 2 at which solder is not fused with the central conductor 2. As a result, there is a portion 11 free of solder in part between the inner peripheral surface 8 of the dielectric member 1 and the central conductor 2. The solder is comparatively soft and plastic and absorbs the difference in thermal deformation between the central conductor 2 and the dielectric member 1 by plastic deformation. The plastic deformation of the solder 7 is made possible by the presence of the solderless portion 11.

The volume of this solderless portion 11 is preferably in the range from 90% to 30% of the volume of the clearance between the dielectric member 1 and the central conductor 2. Specifically, the volume of the solder filled in the clearance between the central conductor 2 and the dielectric member 1 is desirably selected in the range from 10% to 70% of the volume of the entire clearance between the central conductor 2 and the dielectric member 1 at the time of fabrication.

It is recommended that solder be partially filled in the space 11 by applying solder resist to the parts where it is not desired to fill solder. The parts coated with solder resist repel and are kept free of solder which is molten by heat. If the parts filled with solder are less than 10% of the total clearance volume, sufficient electrical connection is not established, while if the figure is more than 70%, the plastic deformation of solder becomes difficult. The solder, therefore, is desirably filled in 50% of the total clearance volume. The solder resist applied to the parts not to be filled with solder does not exhibit any corrosive property against the dielectric member of the central conductor and therefore no problems arise from the remaining solder resist.

Figure 3A:
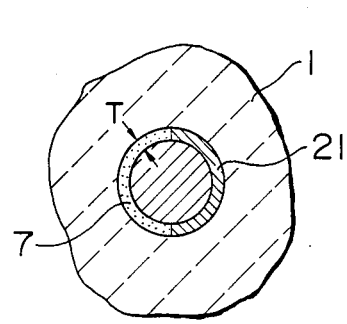
FIGS. 3A and 3B are partial sectional views showing a layout of the solder and the spacial clearance respectively.
Figure 3B:
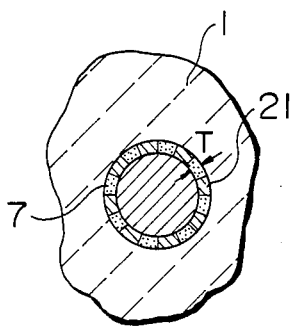

FIGS. 3A and 3B are detailed sectional views taken along line III—III' in FIG. 1 respectively, showing two examples of the method to fill solder. In both cases, the solder 7 is filled in about 50% of the total clearance volume between the central conductor 2 and the dielectric member 1, and the remaining 50% left as a room or space for plastic deformation of the solder. The surface of the inner peripheral electrode 10 of this space is coated with the solder resist 21. In the case of FIG. 3A, the solder is filled in almost one half of the clearance between the central conductor and the dielectric member 1. In the example shown in FIG. 3B, on the other hand, the parts filled with solder and the parts coated with solder resist are arranged alternately. Even this case, the total volume of the parts filled with solder represents approximately 50% of the total volume of the space. In a method of applying solder resist to specific parts as shown in these examples, solder resist is coated on the desired portion of the inner peripheral electrode not to be filled with solder by utilizing the well-known printing technique for printed circuit boards.

Figure 4:
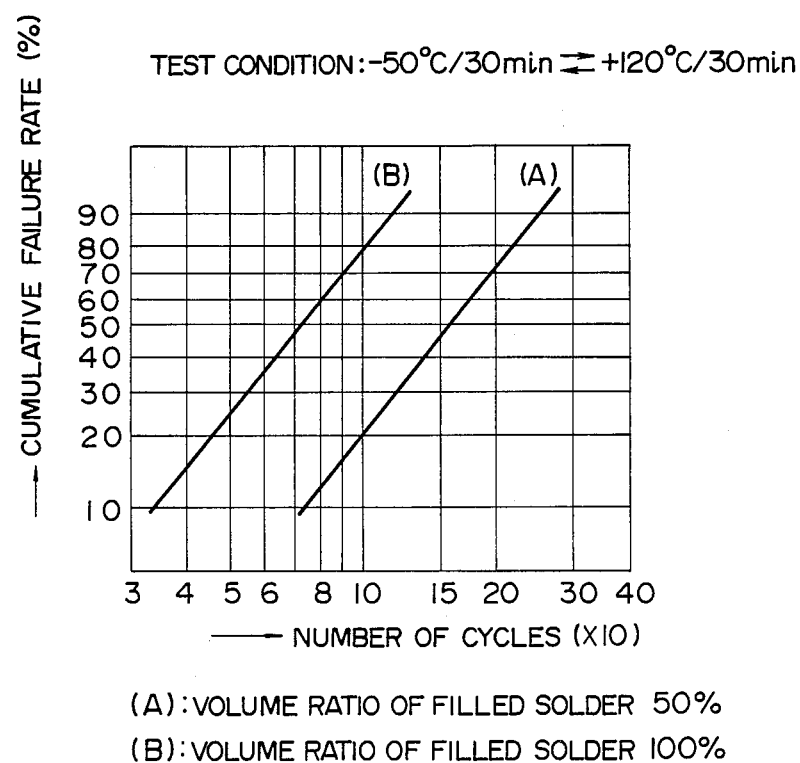
FIG. 4 is a diagram comparing the failure rate of a through-type capacitor according to the present invention with that of a conventional through-type capacitor.

FIG. 4 shows a graph of cumulative failure rate of a through-type capacitor with the solder volumetric ratio of 100% and 50% in the space between the central conductor and the dielectric member. The cumulative failure rate is defined as the ratio in percentage of samples broken to the total number of samples which have been subjected repetitively and alternately to low and high temperature conditions. In FIG. 4, the abscissa represents the number of repetitions (cycles) of changes in temperature conditions. FIG. 4 shows that the failure rate for the case (A) in which solder is filled in 50% of the volume is much lower than for the case (B) where solder is filled up in the entire space at each cycle.

FIG. 5 shows another embodiment formed with a space. In FIG. 5, the connection between the dielectric member 1 and the central conductor 2 is shown in detailed enlarged form as in FIG. 2. In this example a part of the surface of the central conductor 2 facing the dielectric member 1 is formed with a recess. The solder 7 is filled in this recess to connect the inner peripheral electrode 10 and the central conductor 2 electrically. The other parts than the recess is kept free of solder by the solder resist applied on the surface of the central conductor 2.

Now, a construction will be described in which a space free of solder is formed without using solder resist. An open area of the solderless portion 11 is previously plugged with similar resin as the insulating resin 6 when the insulating resin 6 is filled into the case 4 so as to prevent leaking out of the insulating resin 6 through the solderless portion 11.

FIGS. 6A and 6B are sectional views taken along line III—III' of FIG. 1 similar to FIG. 3A. In the embodiment of FIG. 6A, the section of the central conductor 2 facing the dielectric member 1 forms a square inscribing the section (circle) of the through hole. FIG. 7 shows an enlarged view of a corner of the square inscribing the circle, that is, the part defined by a dotted circle in FIG. 6A. The solder 7 is fused between the dielectric member 1 and the central conductor 2 in the manner as shown in FIG. 7. (The inner peripheral electrode surface 10 is not shown.) The gap formed between the corner of the central conductor 2 and the dielectric member 1 is very narrow as compared with that formed between the sides of the central conductor 2 and the dielectric member 1. As a result, the molten solder is prevented by capillarity and surface tension from flowing out of the region of the narrow gap. A space 11 not filled with solder is thus formed between the sides of the central conductor 2 and the dielectric member 1. The solder expands into this space 11 and is thus capable of absorbing the difference in thermal deformation between the dielectric member and the central conductor.

FIG. 6B shows a central conductor 7 having a section shaped in a star. The apexes of the star are connected with the inner peripheral electrode of the dielectric member 1 by solder substantially in the same manner as in FIG. 7. Solder resist is not required in this case either. The sectional shape of the central conductor is not limited to those mentioned above but other sectional shapes may be selected with equal effect so that the central conductor is in contact with the through hole at the parts where the radii of their curvature differ greatly from each other.

Apart from the embodiments of FIGS. 6A and 6B in which the central conductor 2 has a section not circular, the sectional shape of the central conductor may be circular as shown in the embodiments of FIGS. 8A and 8B with the through hole of the dielectric member having a non-circular section. FIGS. 8A and 8B are both sectional views taken along line III—III' in FIG. 1. FIG. 8A shows a case in which the section of the through hole takes a square form circumscribing a circular central conductor 2. FIG. 8B, on the other hand, shows a case in which the through hole has an elliptical section circumscribing a circular central conductor. In both cases, the parts of the sectional form of the central conductor and the through hole in contact with each other form a very narrow gap as compared with the other parts thereof, so that a connection similar to that in FIG. 7 is established, thereby forming a space 11 not filled with solder. In the cases of FIGS. 8A and 8B, if the section of the dielectric member 1 is circular, the outline thereof is different from the section of the through hole. In the case of FIG. 8A, for example, the through hole has a square section and the dielectric member a circular section, so that the distance between the outer peripheral electrode and the inner peripheral electrode measured from a corner of the square is different from that measured from a side thereof, and the electric field concentrates in a shorter distance between the parts. This is also the case with an elliptical through hole. This concentration of electric field can be prevented by forming the section of the dielectric member 1 into a shape similar to the section of the through hole.

I claim:

1. A through-type capacitor comprising:
    a dielectric member having a hole formed substantially through the center thereof;
    a first electrode surface formed on the outer peripheral surface of the dielectric member;
    a second electrode surface formed on the inner peripheral surface of the through hole of the dielectric member, thereby forming a capacitor;
    a central conductor having a section passable through the through hole of the dielectric member and inserted in the through hole;
    a solder member for connecting the central conductor electrically to the second electrode surface the solder member partially filling a clearance between the second electrode surface and the central conductor so as to at least partially delimit a space to enable the solder member to expand between the central conductor and the second electrode surface.

2. A through-type capacitor according to claim 1, wherein the space represents substantially 90% to 30% of the volume of the clearance defined between the second electrode surface and the central conductor.

3. A through-type capacitor according to claim 2, wherein the central conductor is electrically connected with substantially one half of the second electrode surface, the remaining one half of the second electrode surface facing the space.

4. A through-type capacitor according to claim 3, wherein a part of a surface of said central conductor facing the space is coated with solder resist.

5. A through-type capacitor according to claim 2, wherein a part of a surface of said central conductor facing the space is coated with solder resist.

6. A through-type capacitor according to claim 1, wherein the section of a part of the central conductor facing the second electrode surface has such a shape as to have a plurality of selected one of points and facets connected to the inner peripheral surface of the through hole by way of the solder member, the space being arranged between the selected one of the points and facets.

7. A through-type capacitor according to claim 6, wherein the section of the through hole is circular, that part of the central conductor which faces the second electrode surface has a rectangular section inscribing the circle, the corners of the rectangle are electrically connected to the second electrode surface by the solder member, and the space is defined by the sides of the rectangle and the second electrode surface.

8. A through-type capacitor according to claim 6, wherein the through hole has a circular section, that part of the central conductor which faces the second electrode surface has a section in the form of a star inscribing the circle, the apexes of the star are connected electrically to the second electrode surface by the solder member, and the space is defined by adjacent apexes of the star.

9. A through-type capacitor according to claim 6, wherein the through hole has a section not circular, and the part of the dielectric member surrounded by the first electrode has a section in a shape similar to the section of the through hole.

10. A through-type capacitor according to claim 9, wherein the through hole has a substantially square section, that part of the central conductor which faces the second electrode surface has a circular section inscribing the square, and the central conductor and the second electrode surface are electrically connected to each other by the solder member at the inscribing parts of the circle and the square.

11. A through-type capacitor according to claim 9, wherein the section of the through hole has a substantially elliptical shape, that part of the central conductor which faces the second electrode surface has a circular section inscribing the ellipse, and the central conductor and the second electrode surface are electrically connected to each other by the solder member at the inscribing parts of the circle and the ellipse.

12. A through-type capacitor according to claim 1, wherein the space is a recess formed in the part of the central conductor facing the second electrode surface.

13. A through-type capacitor according to claim 12, wherein the space represents substantially 90% to 30% of the volume of the clearance defined by the second electrode surface and the central conductor.

14. A through-type capacitor according to claim 13, wherein a part of a surface of said central conductor facing the space is coated with solder resist.

* * * * *